United States Patent
Kolman et al.

(10) Patent No.: US 9,906,511 B1
(45) Date of Patent: Feb. 27, 2018

(54) SECURE IMPERSONATION DETECTION (71) Applicants: Eyal Kolman, Tel Aviv (IL); Alon Kaufman, Herut (IL); Yehuda Lindell, Givat Shmuel (IL); Binyamin Pinkas, Tel Aviv (IL)

(72) Inventors: Eyal Kolman, Tel Aviv (IL); Alon Kaufman, Herut (IL); Yehuda Lindell, Givat Shmuel (IL); Binyamin Pinkas, Tel Aviv (IL)

(73) Assignees: Bar-Ilan University, Ramat Gan (IL); EMC IP Holding Company LLC, Hopkinton, MA (US)

( * ) Notice: Subject to any disclaimer, the term of this patent is extended or adjusted under 35 U.S.C. 154(b) by 109 days.

(21) Appl. No.: 14/753,458

(22) Filed: Jun. 29, 2015

(51) Int. Cl.
*H04L 29/06* (2006.01)
*H04L 9/32* (2006.01)

(52) U.S. Cl.
CPC ............ *H04L 63/08* (2013.01); *H04L 9/3242* (2013.01); *H04L 63/0428* (2013.01); *H04L 63/10* (2013.01); *G06F 2221/2111* (2013.01)

(58) Field of Classification Search
None
See application file for complete search history.

(56) References Cited

U.S. PATENT DOCUMENTS

| | | | |
|---|---|---|---|
| 7,107,445 B2 | 9/2006 | Trapp et al. | |
| 7,856,100 B2 | 12/2010 | Wang et al. | |
| 8,010,782 B2 | 8/2011 | Kerschbaum | |
| 8,281,148 B2 | 10/2012 | Tuyls et al. | |
| 8,862,895 B2 | 10/2014 | Rieffel et al. | |
| 8,925,075 B2 | 12/2014 | Krendelev | |
| 8,954,730 B2* | 2/2015 | Roskind | G06F 21/316 |
| | | | 705/66 |
| 9,160,742 B1* | 10/2015 | Ackerman | H04L 63/0853 |
| 9,191,196 B2 | 11/2015 | Raykova et al. | |
| 9,197,637 B2 | 11/2015 | Sy et al. | |
| 9,215,219 B1 | 12/2015 | Krendelev et al. | |
| 9,276,734 B2 | 3/2016 | Naganuma | |
| 9,686,248 B2* | 6/2017 | Dover | H04L 63/0428 |
| 2002/0023059 A1* | 2/2002 | Bari | G06F 21/41 |
| | | | 705/76 |
| 2010/0037046 A1* | 2/2010 | Ferg | H04L 9/321 |
| | | | 713/155 |

(Continued)

OTHER PUBLICATIONS

Lindell, Y. and Pinkas B., "Secure Multiparty Computation for Privacy-Preserving Data Mining" (May 6, 2008) [retrieved on May 3, 2017]. Cryptology ePrint Archive [online]. Retrieved from Internet <URL: http://eprint.iacr.org/2008/197.pdf>.

*Primary Examiner* — Kaveh Abrishamkar
(74) *Attorney, Agent, or Firm* — BainwoodHuang (57) ABSTRACT

Techniques of performing impersonation detection involve using encrypted access request data. Along these lines, an impersonation detection server stores historical access request data only in encrypted form and has no way to decrypt such data. When a new access request is received by a client, the client sends the username associated with the request to the server, which in turns sends the client the encrypted historical access request data. In addition, the server sends the client instructions to perform impersonation detection. The client then carries out the instructions based on the encrypted historical access request data and data contained in the new access request.

20 Claims, 5 Drawing Sheets

(56) References Cited

U.S. PATENT DOCUMENTS

| | | | |
|---|---|---|---|
| 2012/0324228 A1* | 12/2012 | Padhye | ............... H04L 9/0869 |
| | | | 713/176 |
| 2013/0097417 A1 | 4/2013 | Lauter et al. | |
| 2013/0219472 A1* | 8/2013 | Hsu | ..................... H04L 63/08 |
| | | | 726/4 |
| 2013/0254532 A1 | 9/2013 | Raykova et al. | |
| 2014/0281506 A1* | 9/2014 | Redberg | ............... H04L 63/067 |
| | | | 713/159 |
| 2014/0310779 A1* | 10/2014 | Lof | ................. H04L 63/0421 |
| | | | 726/4 |
| 2015/0244517 A1 | 8/2015 | Nita | |

* cited by examiner

SECURE IMPERSONATION DETECTION

BACKGROUND

Impersonation detection systems quantify the risk that someone is impersonating a user who has rights to access a resource. An example of an impersonation detection system is a web server of an online bank that receives login attempts (e.g., submissions of usernames and passwords) from people wishing to access accounts. Along these lines, in response to a login attempt to access a user's account, the web server extracts any of a number of features describing the login attempt, e.g., geolocation, login time, hostname, autonomous system number/name, country of origin. The web server then quantifies the risk that the login was attempted by an imposter by inputting the extracted features into a risk model that outputs a risk score, where higher risk scores indicate higher risk that the login was attempted by an imposter. When the risk score is greater than a threshold, the web server may deny access to the user's account.

Conventional approaches to impersonation detection use a third party server to store historical login attempt data and generate risk scores based on the historical login attempt data. For example, when the web server of the online bank receives a login attempt that involves a user's account, the web server sends the features describing the login attempt to the third party server. The third party server then inputs the features and the user's historical login attempt data into a risk model that outputs a risk score. The third party server sends the risk score to the web server so that the web server may grant or deny access to the user's account.

SUMMARY

Unfortunately, there are deficiencies with the above-described conventional approaches to impersonation detection. For example, there are potential liabilities that come with storing sensitive information such as historical login attempt data in the raw form needed as input into risk models. Along these lines, many clients of a third party impersonation detection service (e.g., the online bank) would rather not send sensitive information in raw form. Further, certain regulations prohibit the export of such sensitive information to third parties.

One way to address this issue is to have a client of the third party service encrypt the sensitive information before sending it to the third party service. However, while this might satisfy the regulations, the risk models used in the conventional approaches would not be able to work with this information in encrypted form.

In contrast to the conventional approaches to impersonation detection that require sensitive information in raw form, improved techniques of performing impersonation detection involve using encrypted access request data. Along these lines, an impersonation detection server stores historical access request data only in encrypted form and has no way to decrypt such data. When a new access request is received by a client, the client sends the username associated with the request to the server, which in turns sends the client the encrypted historical access request data. In addition, the server sends the client instructions to perform impersonation detection. The client then carries out the instructions based on the encrypted historical access request data and data contained in the new access request.

Advantageously, the improved techniques allow a client to determine the risk of impersonation in an access request without exposing sensitive information to a third party. Further, the third party that operates the server sends the client instructions in a garbled format so that the third party's methodology of analyzing risk remains proprietary. The garbling of the instructions does not prohibit the client from computing the same risk score as would be computed using the conventional approaches. Rather, by using a procedure known as Yao's protocol, the client is able to generate a risk score without knowing the details of the instructions and without decrypting the encrypted historical access request data. Moreover, Yao's protocol allows for the generation of the risk score much more quickly—by several orders of magnitude—than other protocols such as fully homomorphic encryption (FHE).

One embodiment of the improved techniques is directed to a method of performing impersonation detection. The method includes receiving, by a client computer, an access request that identifies a user and includes current access request data. The method also includes, after receiving the access request, obtaining, by the client computer from a server computer, (i) encrypted historical access request data representing previous access request activity of the user stored in the server computer and (ii) instructions to perform an impersonation detection operation. The method further includes performing, by the client computer while the historical access request data remains encrypted, the impersonation detection operation based on the encrypted historical access request data and the current access request data to produce an impersonation detection result, the impersonation detection result indicating whether the access request was submitted by a person impersonating the user.

Additionally, some embodiments are directed to an apparatus constructed and arranged to perform impersonation detection. The apparatus includes a network interface, memory and controlling circuitry coupled to the memory. The controlling circuitry is constructed and arranged to carry out a method of performing impersonation detection.

Further, some embodiments are directed to a computer program product having a non-transitory, computer-readable storage medium which stores executable code, which when executed by a controlling circuitry, causes the controlling circuitry to perform a method of performing impersonation detection.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of performing impersonation detection use encrypted access request data. Along these lines, an impersonation detection server stores historical access request data only in encrypted form and has no way to decrypt such data. When a new access request is received by a client, the client sends the username associated with the request to the server, which in turns sends the client the encrypted historical access request data. In addition, the server sends the client instructions to perform impersonation detection. The client then carries out the instructions based on the encrypted historical access request data and data contained in the new access request.

Advantageously, the improved techniques allow a client to determine the risk of impersonation in an access request without exposing sensitive information to a third party. Further, the third party that operates the server sends the client instructions in a garbled format so that the third party's methodology of analyzing risk remains proprietary.

Figure 1:
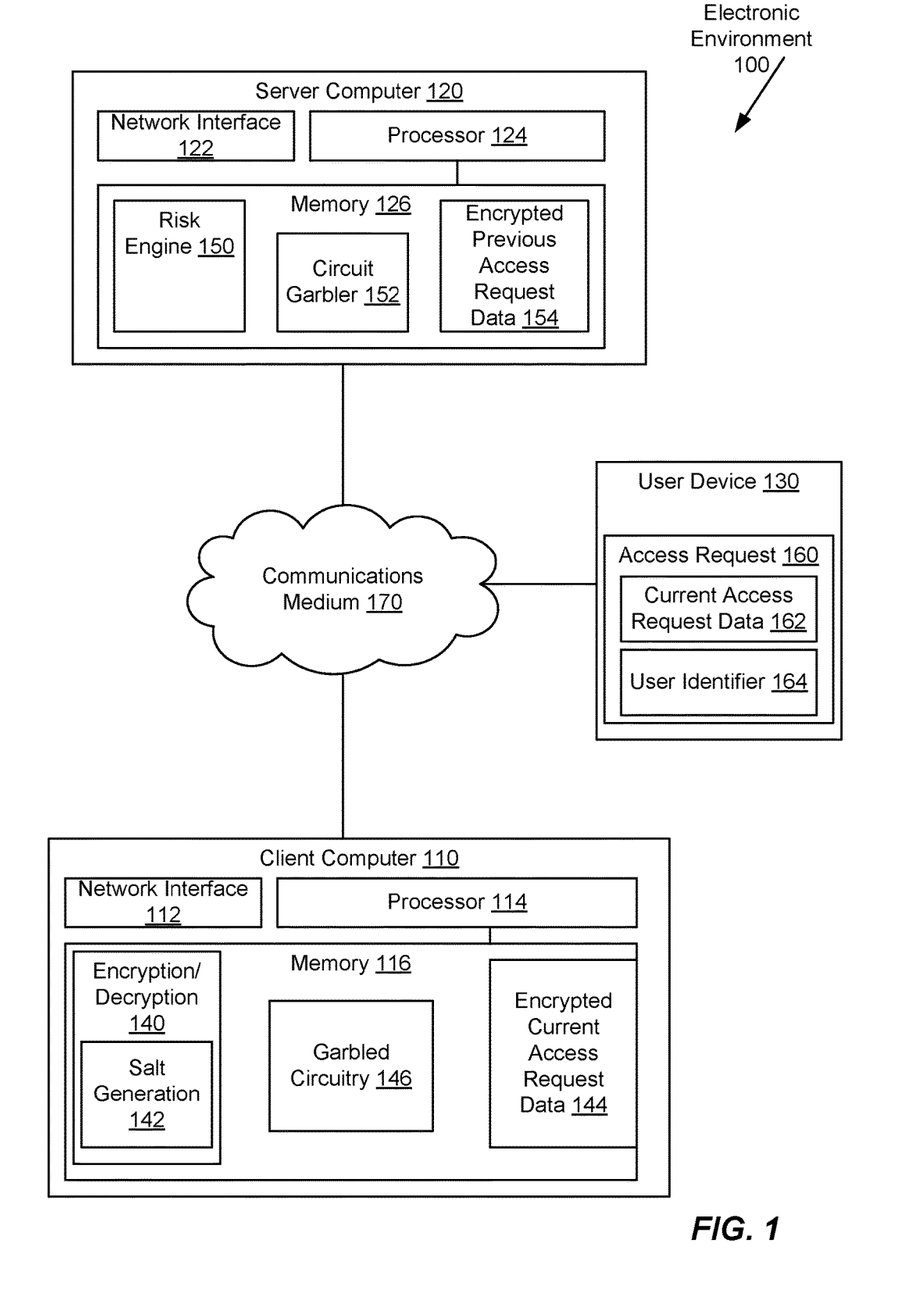
FIG. 1 is a block diagram illustrating an example electronic environment in which the improved technique can be carried out.

FIG. 1 shows an example electronic environment 100 in which embodiments of the improved techniques hereof can be practiced. The electronic environment 100 includes a client computer 110, a server computer 120, a user device 130, and a communications medium 170.

The client computer 110 is constructed and arranged to process a large number of requests 180 to access resources. For example, the client computer 110 may be part of a family of servers operated by an online entity such as a bank or a government agency. As illustrated in FIG. 1, the client computer 110 includes a network interface 112, a processor 114, and memory 116. The network interface 112 includes, for example, adapters, such as SCSI target adapters and network interface adapters, for converting electronic and/or optical signals received from the communications medium 170 to electronic form for use by the client computer 110. The processor 114 includes one or more processing chips and/or assemblies. In a particular example, the processor 114 includes multi-core CPUs. The memory 116 includes both volatile memory (e.g., RAM), and non-volatile memory, such as one or more ROMs, disk drives, solid state drives, and the like. The processor 114 and the memory 116 together form control circuitry, which is constructed and arranged to carry out various functions as described herein.

The memory 116 is also constructed and arranged to store various data, for example, encrypted current access request data 144. The memory 116 is further constructed and arranged to store a variety of software constructs realized in the form of executable instructions, such as encryption/decryption module 140 and garbled circuitry 148. When the executable instructions are run by the processor 114, the processor 114 is caused to carry out the operations of the software constructs. Although certain software constructs are specifically shown and described, it should be understood that the memory 116 typically includes many other software constructs, which are not shown, such as an operating system, various applications, processes, and daemons, for example.

The encryption/decryption module 140 performs encryption of previous access request data to be stored in the server computer 120. The encryption/decryption module 140 also performs decryption of certain previous access request data as needed for initial evaluation of risk. Along these lines, the encryption/decryption module 140 may generate keys to use in various encryption schemes. For example, the client computer 110 may use the encryption/decryption module 140 to generate keys using the cipher block chaining mode of the advanced encryption standard (AES-CBC). In another example, the client computer 110 may use the encryption/decryption module 140 to compute a keyed-hash message authentication code (HMAC).

As illustrated in FIG. 1, the encryption/decryption module 140 includes a salt generation module 142. A salt is a random number that is appended to a string prior to a hash-based encryption in order to provide protection against security vulnerabilities caused by repeating strings. For example, suppose that the client computer computes an HMAC of a hostname of a user device in a previous login attempt. If the hostname does not change in a new login attempt, then the HMAC of the hostname will be the same as in the previous login attempt. Having identical HMACs of the hostname or any other sensitive data is a potential security vulnerability because a third party knows that the hostnames of the user device are not changing between login attempts. However, when the client computer 110 appends a new salt generated with the salt generation module 142 to the hostname associated with each new login attempt, the resulting HMACs will be different, curing the potential security vulnerability.

The garbled circuitry 148 represents instructions to carry out impersonation detection operations according to the risk engine 150 stored on the server computer 120. The evaluation of the garbled circuitry 150 is performed according to Yao's protocol. The garbled circuitry 150 takes the form of logic gates having input and output wires. The logic gates in turn are represented by truth tables that map possible binary values of the input wires to possible binary values of the output wire. The circuitry 150 is garbled because the possible binary values encapsulated in the truth tables of the logic gates are replaced with random binary strings of a fixed length (e.g., 128 bits) and the order of the entries of the truth tables scrambled so that the client does not know what any particular truth table represents. Only the output wires of terminal logic gates reveal their binary values so that the client computer 110 may generate a risk score.

The encrypted access request data 144 represents the result of the current access request data 162 encrypted with the encryption/decryption module 140.

The server computer 120 is constructed and arranged to store large amounts of encrypted data representing previous access requests and to provide a risk model that enables computation of risk scores according to the previous access request data. For example, the server computer 120 may be part of a family of servers operated by third party security entity such as EMC, Inc. of Hopkinton, Mass. As illustrated in FIG. 1, the server computer 120 includes a network interface 122, a processor 124, and memory 126. The network interface 122 includes, for example, adapters, such as SCSI target adapters and network interface adapters, for converting electronic and/or optical signals received from the communications medium 170 to electronic form for use by the server computer 120. The processor 124 includes one or more processing chips and/or assemblies. In a particular example, the processor 124 includes multi-core CPUs. The memory 126 includes both volatile memory (e.g., RAM), and non-volatile memory, such as one or more ROMs, disk drives, solid state drives, and the like. The processor 124 and the memory 126 together form control circuitry, which is constructed and arranged to carry out various functions as described herein.

The memory 126 is also constructed and arranged to store various data, for example, encrypted previous access request data 154. The memory 126 is further constructed and arranged to store a variety of software constructs realized in the form of executable instructions, such as risk engine 150 and circuit garbler 152. When the executable instructions are run by the processor 124, the processor 124 is caused to carry out the operations of the software constructs. Although certain software constructs are specifically shown and described, it should be understood that the memory 126 typically includes many other software constructs, which are not shown, such as an operating system, various applications, processes, and daemons, for example.

The risk engine 150 provides instructions for computing a risk score from previous and current access request data. The instructions take the form of a mathematical function of the previous and current access request data, outputting a risk score. For example, the function may take as inputs the binary representations of hostnames of a previous and a current user device. The function may be as simple as "If the current hostname is equal to the previous hostname, then the risk score is zero." However, the function is typically more complicated. Further, the function may change over time due to machine learning processes.

The circuit garbler 152 represents the mathematical function provided by the risk engine 150 as a set of logic gates and garbles the circuits by rearranging entries of the truth tables representing the gates to produce the garbled circuitry 148. For example, a test for equality may be expressed in terms of inverted XOR gates. The circuit garbler 152 replaces the truth tables of the inverted XOR gates with 128-bit binary strings and rearranges the order of the entries of the truth tables to disguise the nature of the logic gate resented to the client computer 110. The client computer 110 may then evaluate the garbled circuitry 148 according to Yao's protocol.

The encrypted previous access data 154 represents the result of the previous access request data encrypted by the client computer 110 with the encryption/decryption module 140. It should be understood that the encrypted previous access data 154 is received in encrypted form by the server computer 120 and the server computer 120 does not possess a way to decrypt this data, i.e., using the keys generated during the encryption process.

The user device 130 is any electronic device from which a person may submit a request 160 over the communications medium 170 to access a resource controlled by the client computer 110. For example, the user device may take the form of a desktop computer, a laptop computer, tablet computer, smartphone, smart watch, or the like.

The access request 160 may take the form of a login request including a user identifier 164 (e.g., username) and password. Typically, the correct input of the username and password into text boxes of a login page of a web site allows access to the resource (e.g., a bank account of a user). However, in addition, the access request 160 provides to the client computer 110 current access request data 162. Current access request data 162 includes, for example, the time at which the access request 160 was submitted, a geolocation of the user device 130 at that time, a hostname of the user device 130, a network identifier identifying a network by which the user device is connected to the communications medium 170 (and even the communications medium itself), and a country identifier identifying the country in which the access request 160 was submitted.

The communications medium 170 provides network connections among the client computer 110, the server computer 120, and the user device 130. Communications medium 170 may implement any of a variety of protocols and topologies that are in common use for communications over the Internet. Furthermore, communications medium 170 may include various components (e.g., cables, switches/routers, gateways/bridges, etc.) that are used in such communications.

During operation, the client computer 110 receives the access request 160 from the user device 130 over the communications medium 170. In response, the client computer 110 locally stores the current access request data 162 and sends the user identifier 164 to the server computer 120 over the communications medium 170. For example, when the client computer 110 is operated by an online bank, the request 130 arrives in the form of a username 162 identifying an account or accounts to be accessed and a password ostensibly proving that the owner of the account(s) is the person that submitted the request. However, an adversary may have stolen the owner's credentials and is now attempting to impersonate the owner. The client computer 110 will use the access data 162 to determine whether that is the case.

Upon receiving the user identifier 164, the server computer 120 performs a lookup operation in a database to retrieve the encrypted previous access request data 154 associated with the username 164. The server computer 120 sends the encrypted previous access request data 154 to the client computer 110 over the communications medium 170.

Further, the server computer 120 transforms the instructions contained in the risk engine 150 into a circuit containing logic gates and their wires. The server computer garbles the circuit using circuit garbler 152 as described above and produces garbled circuitry 148. The server computer 120 then sends the garbled circuitry 148 to the client computer 110.

Upon receiving the encrypted previous access request data 154 and the garbled circuitry 148, the client computer 110 generates a risk score based on the encrypted previous access request data 154 and the current access request data 162. As illustrated in FIG. 1, the client computer also encrypts at least a portion of the current access request data 162 to produce the encrypted current access request data 144. The client computer 110 then inputs the encrypted current access request data 144 and the encrypted previous access request data 154 into the garbled circuitry 148 according to Yao's protocol to produce a risk score. The client computer 110 grants or denies access to the resource based on the generated risk score.

Figure 2:
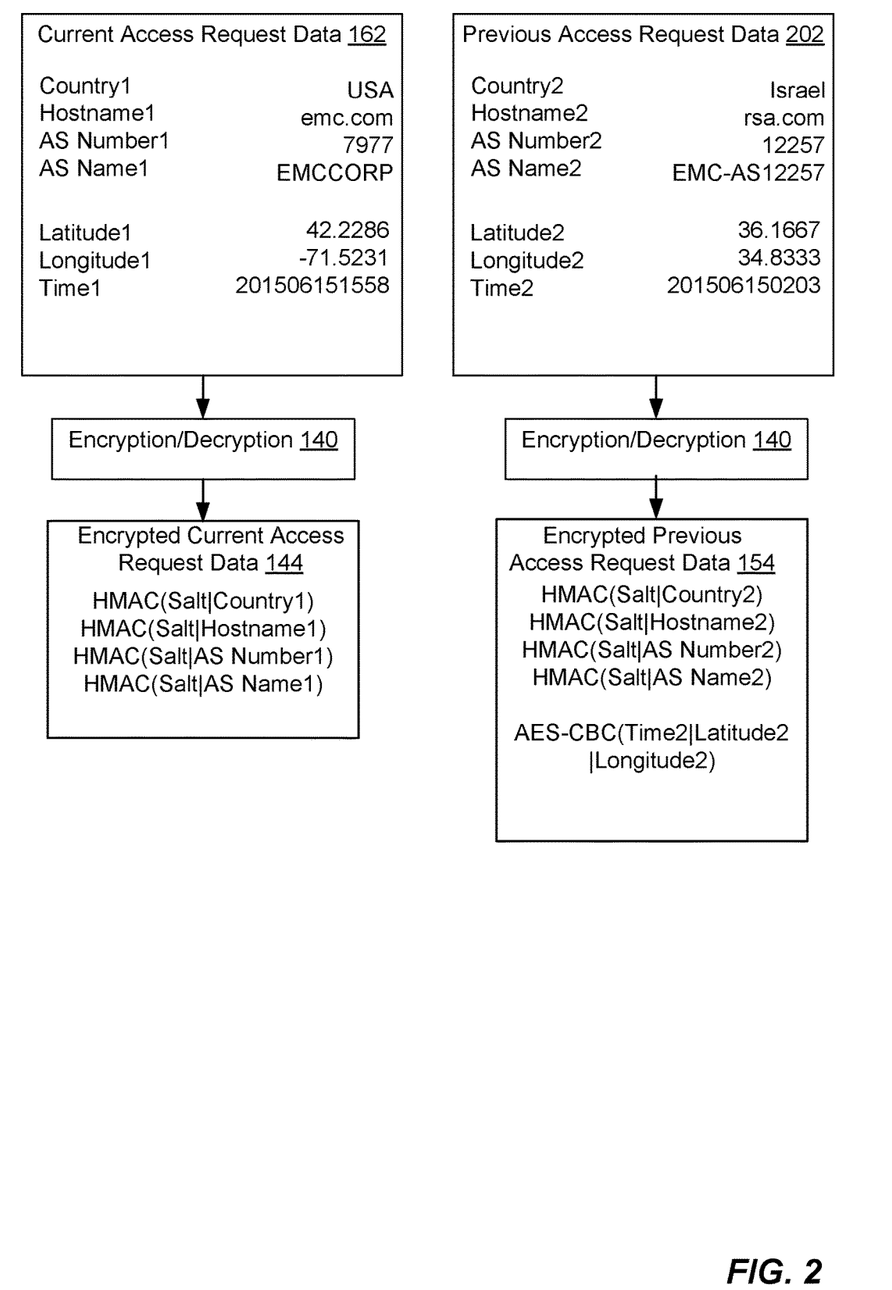
FIG. 2 is a block diagram illustrating example encrypted current and historical access request data within the electronic environment illustrated in FIG. 1.
Figure 3:
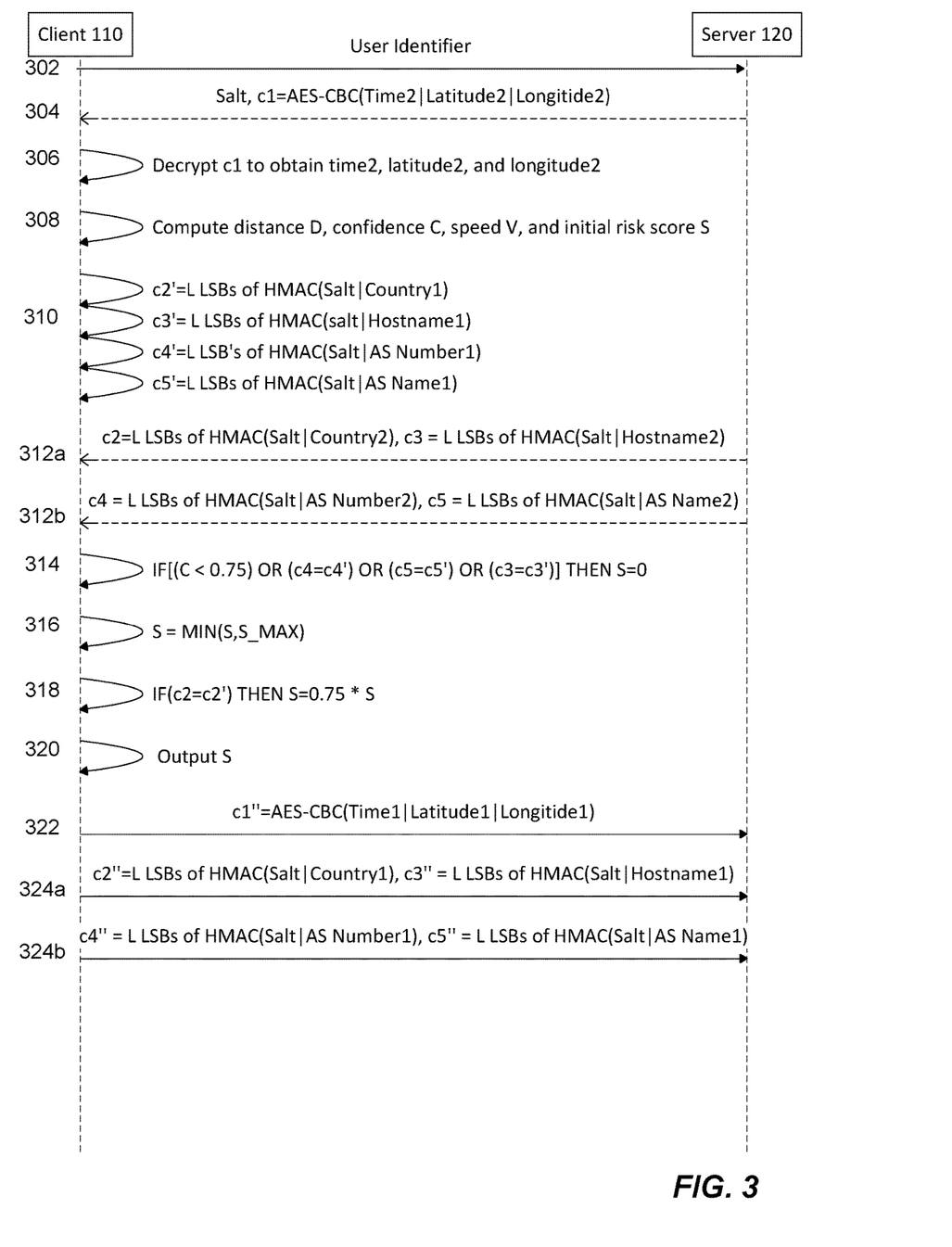
FIG. 3 is a sequence diagram illustrating an example impersonation detection protocol within the electronic environment illustrated in FIG. 1.
Figure 4:
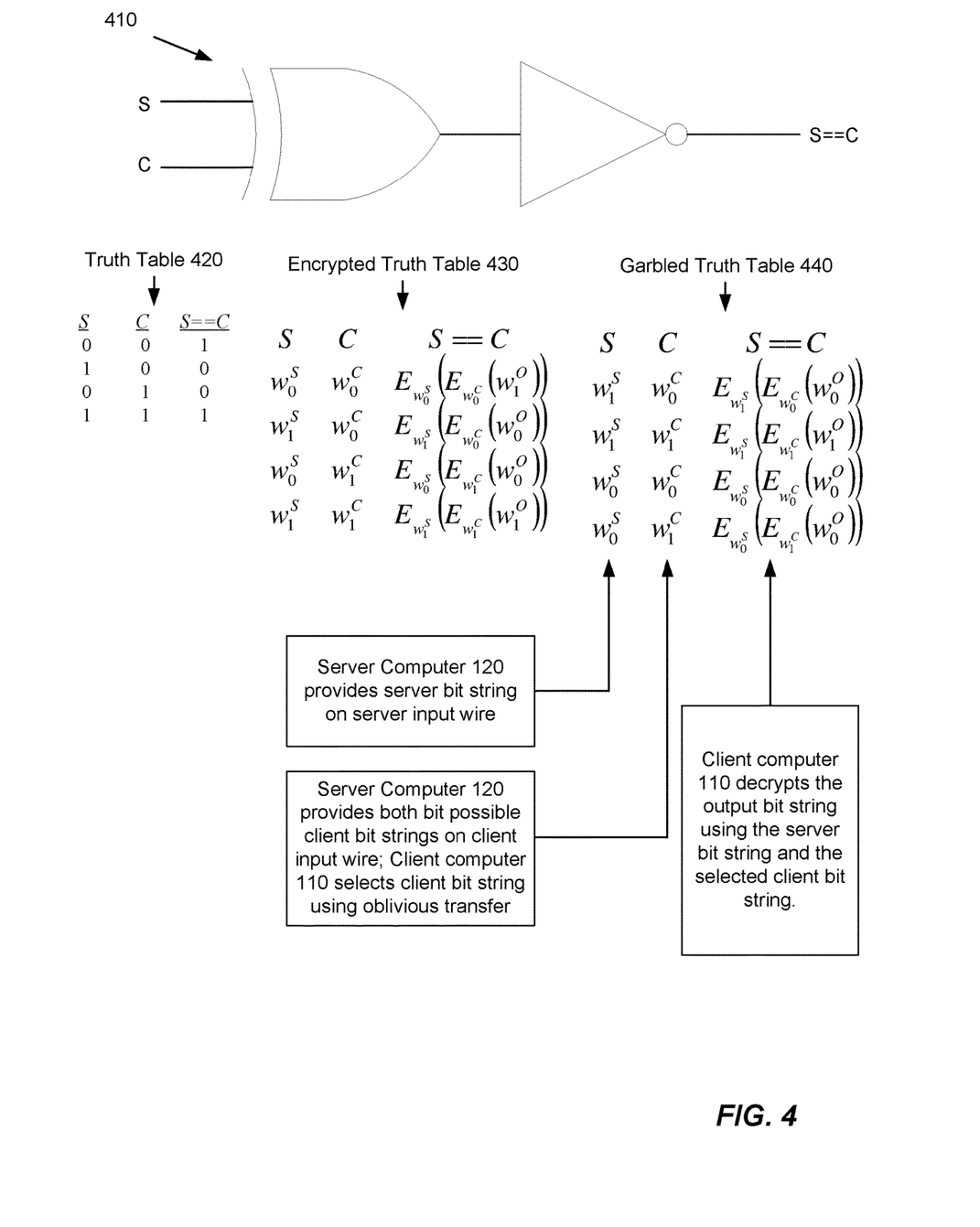
FIG. 4 is a block diagram illustrating an example circuit evaluation using Yao's protocol within the electronic environment illustrated in FIG. 1.

FIGS. 2, 3, and 4 provide a specific example of the above-described impersonation detection process. In particular, FIG. 2 illustrates a specific example of current access request data 162 and previous access request data 202. In this example, the current access request data 162 contains specific values of features commonly used in impersonation detection operations. The features included in the current access request data 162 are a country of origin ("Country1"), a hostname of the user device 130 ("Hostname1"), an autonomous system number and name representing a unique network identifier from which the user device 130 connects to the communications medium 170 ("AS Number1", "AS Name1"). Other features included in the current access request data 162 are the time at which the access request 160 was submitted ("Time1") and the longitude and latitude of a geolocation of the user device 130 at the time at which the access request 160 was submitted ("Latitude1", "Longitude1").

The previous access request data 202 is stored in encrypted form in the server computer 120 as the encrypted previous access request data 154. In raw form, the previous access request data 202 contains values of the same features as those presented in the current access request data 162, except the values in this case are denoted by the appendage of a "2" rather than a "1" as shown in the current access request data 162, i.e, "Country2", "Hostname2", and so on.

It should be understood that the use of both an AS number and an AS name provides a check against a clear issue in the request 160. For example, if the AS numbers of the current request 160 and the previous request 202 are the same but the respective AS names are different, then there is an error in one of the requests that should result in a further investigation and an increase in the risk score.

To form the encrypted previous access request data 154, the client computer 110 encrypts the current access request data 202 using the encryption/decryption module 140. Specifically, the client computer 110 concatenates a salt value generated using the salt generation module 142 with each of the country, hostname, and AS name and number to form respective salted strings. The client computer 110 then generates the HMAC of the salted strings and a respective key for decryption.

However, the client computer 110 encrypts the time, latitude, and longitude values using a different encryption scheme. The scheme involves concatenating the time, latitude, and longitude values together to form a concatenated string. The client computer then performs an encryption of the concatenated string using the cipher block chaining mode of the advanced encryption standard (AES-CBC), generating a respective key for decryption.

Moreover, the client computer 110 encrypts a portion of the current access request data 162 using the encryption/decryption module 140 to produce the encrypted current access request data 144. In this example, the features encrypted are the country, the hostname, and the AS name and number. Specifically, the client computer 110 concatenates the same salt value used in the encryption of the country, hostname, and AS name and number in the previous access request data 202 to form a salted string. The client computer 110 then generates the HMAC of the salted string. However, the client computer 110 does not encrypt the time, latitude, and longitude values of the current access request 160 until the client computer 110 is ready to store these values in the server computer 120.

FIG. 3 illustrates a sequence diagram representing an example process by which the client computer 110 and the server computer 120 combine to perform an impersonation detection in response to the access request 160.

At 302, the client computer 110 sends the user identifier 164 to the server computer 120. The client 110 sends the user identifier 164 in response to receiving the access request 160 from the user device 130.

At 304, the server 120 sends the client computer 110 the salt value used to encrypt the country, hostname, and AS name and number in the previous access request data 202. Also, the server computer 120 sends the client computer 110 an encrypted string $c_1$ which is the AES-CBC encryption of the concatenation of the previous time, latitude, and longitude values. Finally, the server computer 120 sends the garbled instructions 148 to compute the risk score.

At 306, the client computer 110 uses the key generated during the AES-CBC encryption process to decrypt $c_1$ and thereby produce the values of Time2, Latitude2, and Longitude2, i.e., the previous values of these features.

At 308, the client computer uses these decrypted values to compute the following quantities: distance D, confidence C, speed V, and initial risk score S as follows:

$$D = R \arccos(\sin\theta_1\sin\theta_2 + \cos\theta_1\cos\theta_2\cos(\phi_1 - \phi_2)),$$

$$C = \max\left\{1 - \frac{D_{err}}{D}, 0\right\}$$

$$V = \frac{D}{|t_1 t_2| + \varepsilon}, \text{ and}$$

$$S = \frac{V - V_{min}}{V_{max} - V_{min}},$$

where $\theta_1$=Latitude1, $\theta_2$=Latitude2, $\phi_1$=Longitude1, $\phi_2$=Longitude2, $D_{err}$=750 km is a minimum distance by which the distance measurement is meaningful, $\epsilon$=10$^{-4}$, $V_{min}$=0 is a minimum expected speed of travel, and $V_{max}$=815 km/hr is a maximum expected speed of travel. It should be understood that these parameter values may change according to instructions provided by the server computer 120.

At 310, the client computer 110 concatenates the received salt value with each of the values Country1, Hostname1, AS Number1, and AS Name1 received in the access request 160. As part of the encryption, the client computer then forms the HMAC of each of the concatenated strings and forms the following:

$c_2'$ from the L least significant bits (LSBs) of HMAC (salt|Country1) (where "|" denotes a concatenation), where L=32 for example;
$c_3'$ from the L LSBs of HMAC(salt|Hostname1);
$c_4'$ from the L LSBs of HMAC(salt|AS Number1);
$c_5'$ from the L LSBs of HMAC(salt|AS Name1).

At 312a and 312b, the client computer 110 receives the following from the server computer 120:

$c_2$ from the L LSBs of HMAC(salt|Country2);
$c_3$ from the L LSBs of HMAC(salt|Hostname2);
$c_4$ from the L LSBs of HMAC(salt|AS Number2);
$c_5$ from the L LSBs of HMAC(salt|AS Name2).

The client computer 110 begins evaluating the risk score according to the garbled instructions 148. It should be understood that the evaluation process illustrated in 314, 316, and 318 is one particular example and there are other processes by which the risk score may be computed.

At 314, the client computer evaluates the following logical condition:

$(C<0.75)V(c_4=c_4')V(c_3=c_3')V(c_5=c_5')$, where V is the logical OR operator. It should be understood that the numerical quantities may be represented as integers of a specified size. For example, the value of C may be represented as a 32-bit integer. In this way, in order to see whether the condition C<0.75 is satisfied, the client computer 110 need only check to see whether the first most significant bits of C have the value of 1. Further, each equality test is equivalent to an inverted XOR gate. If the above logical condition is true (i.e., the inequality and the three bitwise equalities), then the client computer 110 sets the risk score S to zero. Otherwise, S remains at its initial value.

At 316, the client computer 110 forces a 16-bit integer representation of the risk score S to be divisible by 4 by multiplying S by 4. The client computer then computes the following quantity:

$S=\min\{S, S_{max}\}$, where $S_{max}$=4000. Specifically, $S_{max}$ is chosen to optimize the number of logical gates used in the computation of the min function.

The client computer 110 breaks the computation of the min function itself into two stages. First, the client computer 110 tests whether $S \leq S_{max}$ to produce a bit indicating whether this inequality is true. Then the client computer 110 the min value based on the produced value of the bit.

In the first stage, the client computer 110 inverts the result of the logical condition $S > S_{max}$. To see how this is done, consider the 16-bit representation of $S_{max}$=4000, which is 0000111110100000. This is four 0's, then five 1's, then one 0, then one 1, then five 0's. The client computer 110 breaks the 16-bit representation up into a similar grouping of bits (i.e., four bits, five bits, one bit, one bit, five bits) and compares the respective bits in each grouping from left to right. Denote the first grouping of 0's as $0_1$ (i.e., the first four zeroes), the first grouping of 1's as $1_1$, the second grouping of 0's as $0_2$, and so on. Denote further the following logical functions:

ORs($0_k$): returns 0 when the wires corresponding to the $k^{th}$ grouping of 0's $0_k$ are all zeroes; returns 1 if there is at least 1 within those wires, ANDs($1_k$): returns 0 when there is at least one 1 in the wires corresponding to the $k^{th}$ grouping of 1's $1_k$; returns 1 if all wires in that grouping are 1.

Then $(S>S_{max})$=ORs($0_1$)∨[ANDs($1_1$)∧ORs($0_2$)]∨[ANDs($1_1$)∧ANDs($1_2$)∧ORs($0_3$)], and the output that client computer 110 computes is b=NOT $(S>S_{max})$.

In the second phase, the client computer 110 evaluates whether it should return S or $S_{max}$ as the risk score based on the value of the bit b. In this case, all that is needed is two gates: one for the bits of $S_{max}$ that are 0, another for the bits of $S_{max}$ that are 1. The truth tables for the $i^{th}$ gate depend on the value of the bit b and the value of the bit at the $i^{th}$ position of S. The truth tables are as follows:

|  | b | i | out |
|---|---|---|---|
| $i^{th}$ bit of $S_{max}$ = 0: | 0 | 0 | 0 |
|  | 0 | 1 | 0 |
|  | 1 | 0 | 0 |
|  | 1 | 1 | 1 |

|  | b | i | out |
|---|---|---|---|
| $i^{th}$ bit of $S_{max}$ = 1: | 0 | 0 | 1 |
|  | 0 | 1 | 1 |
|  | 1 | 0 | 0 |
|  | 1 | 1 | 1 |

It should be understood that, when b=0, the output should represent $S_{max}$, while when b=1, the output should represent S.

At 318, the client computer evaluates the logical condition ($c_2=c_2'$). If this condition is true, then the client computer multiplies the risk score S by 0.75. This multiplication may be carried out by shifting the risk score by one bit and then two bits, and adding the shifts. The addition operation may be represented as a series of XOR and AND gates, the AND used for carry operations.

At 320, the client computer outputs the risk score S. In doing so, the client computer 110 converts the risk score S from an integer back to a floating-point decimal representation.

Now that the client computer 110 has securely computed the risk score, the client computer 110 is now ready to store the current access request data 162 in the server computer 120. However, before the client computer 110 can send this sensitive data, it must encrypt this data. The client computer 110 encrypts the current access request data 162 in a similar manner as it encrypted the previous access request data 202.

At 322, the client computer 110 concatenates the values Time1, Latitude1, and Longitude1 to form a concatenated string. The client computer 110 then performs an encryption of the concatenated string using AES-CBC and sends this encrypted bit string to the server computer 120

At 324a and 324b, the client computer 110 generates a new salt using the salt generation module 142. The client computer 110 then concatenates this new salt with each of the bit string representations of the values Country1, Hostname1, AS Number1, and AS Name1. The client computer 110 then computes the following bit strings:

$c_2''$=HMAC(New Salt|Country1),
$c_3''$=HMAC(New Salt|Hostname1),
$c_4''$=HMAC(New Salt|AS Number1),
$c_5''$=HMAC(New Salt|AS Name1), and sends these bit strings to the server computer, along with the new salt value.

FIG. 4 illustrates a specific example of Yao's protocol of evaluating a garbled logic gate that is part of the overall garbled circuit 148. In particular, FIG. 4 shows an inverted XOR gate 410 used in equality tests that are a part of the risk score computation illustrated in FIGS. 2 and 3. Inverted XOR gate 410 has two input wires S and C for the server computer 120 and the client computer 110, respectively and an output wire that indicates whether the input wires S and C contain the same bit value. The inverted XOR gate 410 has a truth table 420.

As part of the garbling process, i.e., Yao's protocol, the server computer 120 replaces each possible bit of the server wire and the client wire with a respective randomly-generated, 128-bit binary string to form an encrypted truth table 430. Specifically, the 128-bit representation of the 0 bit on the server wire is denoted as $w_0^S$, the 128-bit representation of the 1 bit on the server wire is denoted as $w_1^S$, the 128-bit representation of the 0 bit on the client wire is denoted as $w_0^C$, the 128-bit representation of the 1 bit on the client wire is denoted as $w_1^C$, the 128-bit representation of the 0 bit on the output wire is denoted as $w_0^O$, and the 128-bit representation of the 1 bit on the output wire is denoted as $w_1^O$.

Moreover, the server computer 120 encrypts the bit strings of the output wire $w_0^O$ and $w_1^O$ using a symmetric encryption scheme. The key associated with this scheme is a combination of the bit string of the server wire and the bit string of the client wire. That is, instead of two possible values on the output wire, there are four possible values corresponding to the four possible combinations of values of the server and client input wires.

The server computer 120 then randomly shuffles the rows of the encrypted truth table 430 to form the garbled truth table 440. In this way, the client computer 110 has no way to identify the logic gate from the table. Further, once the client computer 110 obtains its bit string for the client input wire, it may obtain the 128-bit string of the output wire without knowing the other bit strings on the output wire.

When the server computer 120 provides the instructions to perform the impersonation detection operation, the server computer 120 provides garbled truth tables such as garbled truth table 440. In addition, the server computer 120 provides the 128-bit string for each of its input wires.

The string that is input on the client wire is determined by oblivious transfer. The idea behind oblivious transfer is that the server computer 120 does not know which of the two possible bit strings the client computer 110 inputs on the client input wire and that the client computer 110 does not recognize the other possible input bit string. An example of oblivious transfer is as follows:

The server computer 120 generates (i) a key pair [d,(N,e)] and (ii) two random bit strings $x_0$ and $x_1$. The server computer 120 sends N, e, $x_0$, and $x_1$ to the client computer 110. The value d is a secret that the client computer 110 will not know.

The client computer 110 knows which binary value b it needs to input, which the server computer 120 will not know. The client computer 110 also generates a secret random number k. The client computer generates the number $v=(x_b+k^e)$ mod N and sends v to the server computer 120.

The server computer 120 computes $k_0=(v-x_0)^d$ mod N and $k_1=(v-x_1)^d$ mod N, which will not be known to the client computer 110. The server computer 120 then computes $w_0^{Ct}=w_0^C+k_0$ and $w_1^{Ct}=w_1^C+k_1$ and sends $w_0^{Ct}$ and $w_1^{Ct}$ to the client computer 110.

The client computer 110 then reveals $w_b^C=w_b^{Ct}-k$. The other string reveals nothing upon subtracting k, so the client computer 110 learns nothing about $w_{1-b}^C$. Meanwhile, the server computer 120 known nothing about b.

For a complicated circuit, there will be many gates with one oblivious transfer per input. The oblivious transfer is the most computationally demanding part of the risk score computation because of the exponentiation operations. However, the oblivious transfers may be performed in parallel.

Once oblivious transfer has completed, the client computer 110 decrypts the value of the output wire using the given value of the server input wire and the obtained value of the client input wire as keys. The client computer 110 is only able to decrypt one of the possible values of the output wire, and the other three possible values will result in noise. One way that the client computer may recognize the correct output value by concatenating a string of 0's to each possible output value. The keys will decrypt the string of 0's as well only for the correct output wire value.

It should be understood that the client computer 110 still does not know what the binary value of the output wire of a gate actually is, but only the binary string representing that value. However, the client computer 110 may feed this new binary string as input into another gate. It is only at a terminal gate that the binary output will be revealed to the client computer 110. The client computer 110 may then generate the risk score from such output.

Yao's protocol also demands that the number of rounds (typically 2-4) be constant. That is, the number of rounds should not depend on the size of the circuit, i.e., the number of gates.

Figure 5:
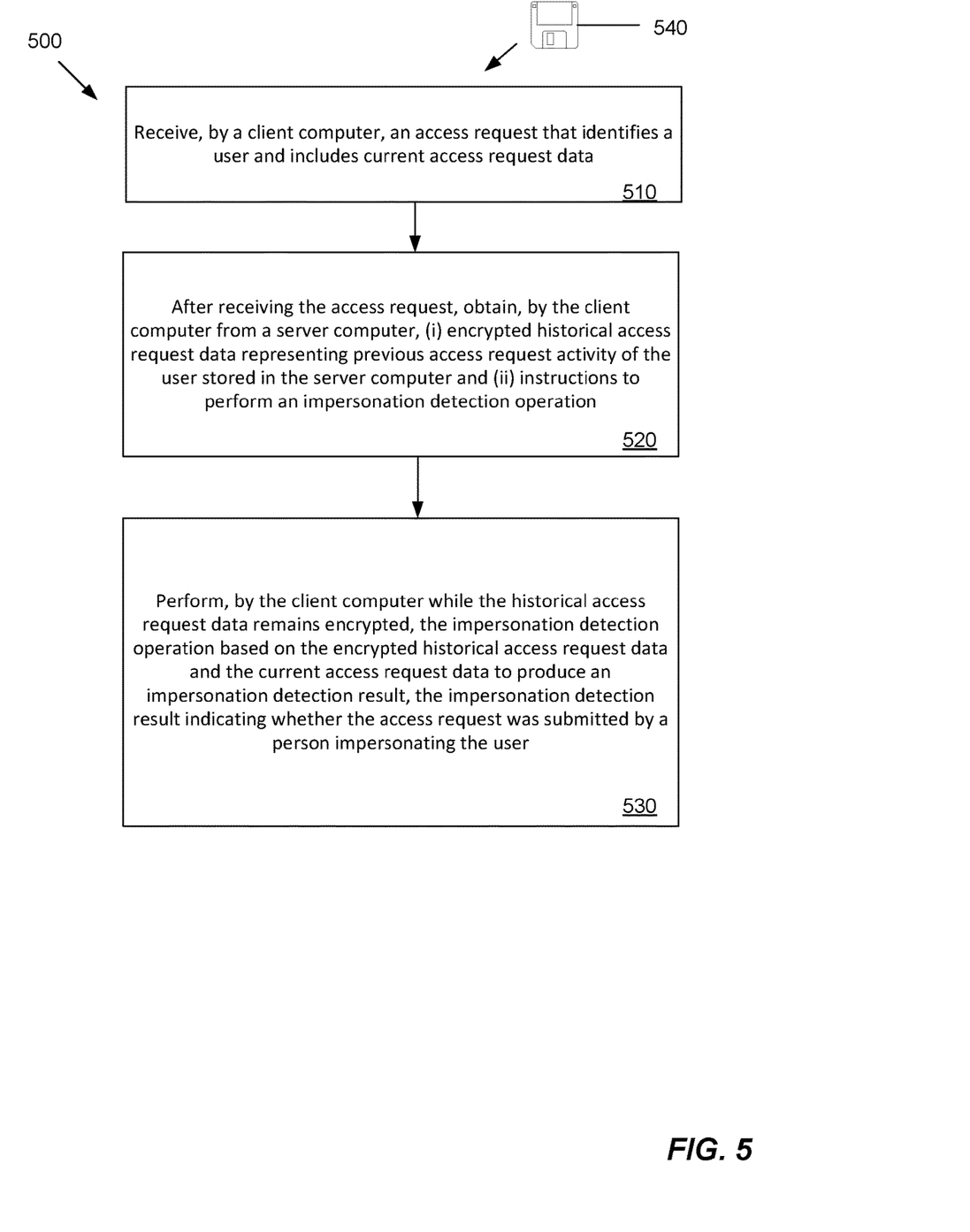
FIG. 5 is a flow chart illustrating a method of carrying out the improved technique within the electronic environment illustrated in FIG. 1.

FIG. 5 illustrates a method 500 of performing impersonating detection. The method 500 may be performed by the software constructs described in connection with FIG. 1, which reside in the memory 116 of the client computer 110 and the memory 126 of the server computer and are respectively run by the processors 114 and 124.

At 510, a client computer receives an access request that identifies a user and includes current access request data.

At 520, after receiving the access request, the client computer obtains, from a server computer, (i) encrypted historical access request data representing previous access request activity of the user stored in the server computer and (ii) instructions to perform an impersonation detection operation.

At 530, the client computer performs, while the historical access request data remains encrypted, the impersonation detection operation based on the encrypted historical access request data and the current access request data to produce an impersonation detection result, the impersonation detection result indicating whether the access request was submitted by a person impersonating the user.

Improved techniques of performing impersonation detection use encrypted access request data. Along these lines, an impersonation detection server stores historical access request data only in encrypted form and has no way to decrypt such data. When a new access request is received by a client, the client sends the username associated with the request to the server, which in turns sends the client the encrypted historical access request data. In addition, the server sends the client instructions to perform impersonation detection. The client then carries out the instructions based on the encrypted historical access request data and data contained in the new access request.

Having described certain embodiments, numerous alternate embodiments or variations can be made. For example, it was assumed that an initial risk score is based on a distance metric. However, there are other metrics by which the initial risk score may be computed, e.g., using biometric or knowledge-based authentication techniques.

Moreover, in some arrangements, the instructions to compute the risk score may include other aspects. For example, the instructions may dictate that the risk score be modified when the previous and/or current AS numbers are located in a list of common internet service providers (ISPs). Specifically, if both AS numbers are found in such a list, then the risk score is multiplied by a first factor. If one of the AS numbers is found in the list, then the risk score is multiplied by a second factor that is larger than the first factor.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 540 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of performing impersonation detection, the method comprising:

receiving, by a client computer, an access request that identifies a user and includes current access request data;

after receiving the access request, obtaining, by the client computer from a server computer, (i) encrypted historical access request data representing previous access request activity of the user stored in the server computer and (ii) instructions to perform an impersonation detection operation; and performing, by the client computer while the historical access request data remains encrypted, the impersonation detection operation based on the encrypted historical access request data and the current access request data to produce an impersonation detection result, the impersonation detection result indicating whether the access request was submitted by a person impersonating the user, wherein the method further comprises, prior to the client computer receiving the access request, encrypting, by the client computer, a set of previous device identifiers to produce a set of encrypted previous device identifiers, the set of previous device identifiers identifying a set of previous devices by which a previous access request was submitted by the user;

wherein the current access request data includes a set of current device identifiers identifying a set of current devices by which the access request was submitted by the user;

wherein the method further comprises encrypting, by the client computer, the set of current device identifiers to produce a set of encrypted current device identifiers;

wherein performing the impersonation detection operation includes comparing the set of encrypted previous device identifiers and the set of encrypted current device identifiers to produce a comparison result, the impersonation detection result being based on the comparison result, wherein each of the set of encrypted previous device identifiers is a bit string including bits;

wherein the instructions to perform the impersonation detection operation include a respective truth table corresponding to each bit of an encrypted previous device identifier of the set of encrypted previous device identifiers, the truth table corresponding to that bit of the encrypted previous device identifier including entries having (i) possible values of that bit of the encrypted previous device identifier, (ii) possible values of a corresponding bit of a respective encrypted current device identifier of the set of encrypted current device identifiers, and (iii) possible values of an output bit based on the possible values of that bit of the encrypted previous device identifier and the possible values of the corresponding bit of the respective encrypted current device identifier; and wherein comparing the set of encrypted previous device identifiers and the set of encrypted current device identifiers includes, for a truth table corresponding to a bit of the encrypted previous device identifier, locating an entry of the truth table, the entry having the value of a bit of the encrypted previous device identifier and a value of a corresponding bit of the respective encrypted current device identifier to produce a value of a corresponding output bit.

2. A method as in claim 1, wherein the set of previous device identifiers includes an encrypted hostname of a previous computer on which the previous access request was input;

wherein the set of current device identifiers includes an encrypted hostname of a current computer on which the access request was input; and wherein comparing the set of encrypted previous device identifiers and the set of encrypted current device identifiers includes testing whether the encrypted hostname of the previous computer and the encrypted hostname of the current computer are equal, the impersonation detection result indicating that the access request was not submitted by a person impersonating the user in response to the encrypted hostname of the previous device and the encrypted hostname of the current device being equal.

3. A method as in claim 2, wherein the set of previous device identifiers further includes an encrypted network identifier of a previous network to which the previous computer was connected when the previous access request was submitted;

wherein the set of current device identifiers further includes an encrypted network identifier of a current network to which the current computer was connected when the current access request was submitted; and wherein comparing the set of encrypted previous device identifiers and the set of encrypted current device identifiers further includes testing whether the encrypted network identifier of the previous network and the encrypted network identifier of the current network are equal, the impersonation detection result indicating that the access request was not submitted by a person impersonating the user in response to the testing finding that the encrypted network identifier of the previous network and the encrypted network identifier of the current network are equal.

4. A method as in claim 1, wherein the impersonation detection result includes a risk score, a larger risk score indicating a larger risk that the access request was submitted by a person impersonating the user;

wherein performing the impersonation detection operation further includes:
  inputting, by the client computer, an initial value of the risk score, and
  modifying the initial value of the risk score based on the comparison result to produce, as the impersonation detection result, a modified value of the risk score.

5. A method as in claim 4, wherein the encrypted historical access data also includes a speed bit string representing (i) a previous time at which the previous access request was submitted and (ii) a previous geolocation of the previous computer at the previous time;

wherein the current access request data includes (i) a current time at which the access request was submitted by the user and (ii) a current geolocation of the current device at the current time;

wherein performing the impersonation detection operation includes:
  decrypting the speed bit string to produce the previous geolocation and the previous time,
  generating a speed based on the current geolocation, the previous geolocation, the current time, and the previous time, and
  producing the initial value of the risk score based on the speed.

6. A method as in claim 4, wherein the encrypted historical access data also includes an encrypted previous country identifier identifying a previous country from which the previous access request was submitted;

wherein the current access request data includes an encrypted current country identifier identifying a current country from which the current access request was submitted;

wherein comparing the set of encrypted previous device identifiers and the set of encrypted current device identifiers includes testing whether the encrypted previous country identifier and the encrypted current country identifier are equal; and wherein modifying the initial value of the risk score includes, in response to the encrypted previous country identifier and the encrypted current country identifier being equal, multiplying the initial value of the risk score by a risk score reduction factor to produce a reduced risk score, the risk score reduction factor being a number between zero and 1.

7. A method as in claim 1, further comprising, for each bit of the set of encrypted previous device identifiers:

replacing, by the server computer, each possible bit value of each entry of the truth table corresponding to a bit of the encrypted previous device identifier with a respective randomly generated bit string of a fixed length;

within each entry of the truth table, using, by the server computer, the randomly generated bit strings that replace the value of the bit of the encrypted previous device identifier and the value of the bit of the encrypted current device identifier to encrypt the randomly generated bit string replacing the output bit of that entry; and shuffling, by the server computer, the entries of the truth table to produce a garbled truth table; and wherein locating the entry of the truth table includes:

selecting the entry of the truth table for which the randomly generated bit strings that replace the value of the bit of the encrypted previous device identifier and the value of the bit of the encrypted current device identifier successfully decrypt the encrypted randomly generated bit string replacing the output bit of that entry.

8. A method as in claim 1, wherein encrypting the set of previous device identifiers to produce the set of encrypted previous device identifiers includes:

generating a previous salt value, concatenating the previous salt value and a previous device identifier of the set of previous device identifiers to produce a previous concatenated string, generating a previous keyed-hash message authentication code (HMAC) from the previous concatenated string, and producing an encrypted previous device identifier from a predetermined number of the least significant bits of the previous HMAC; and wherein encrypting the set of current device identifiers to produce the set of encrypted current device identifiers includes:

receiving the previous salt value, concatenating the previous salt value and a current device identifier of the set of current device identifiers to produce a current concatenated string, generating a current HMAC from the current concatenated string, and producing an encrypted current device identifier from the predetermined number of the least significant bits of the current HMAC.

9. A method as in claim 8, wherein the method further comprises, after performing the impersonation detection operation:

generating, by the client computer, a new salt value that is distinct from the previous salt value;

concatenating the new salt value and a current device identifier of the set of current device identifiers to produce a new concatenated string, generating a new HMAC from the new concatenated string, producing an new encrypted previous device identifier from the predetermined number of the least significant bits of the new HMAC, and sending the new encrypted previous device identifier to the server computer, the server computer being unable to identify whether the user has any repeating values of the current device identifier.

10. A method as in claim 1, wherein the access request received by the client computer is received from an electronic device separate from both the client computer and the server computer.

11. A method as in claim 1, wherein the method further includes, prior to receiving the access request that identifies the user and includes current access request data:

receiving, by the client computer a set of legitimate access requests from a user device of a legitimate user separate from both the client computer and the server computer;

transmitting, the set of legitimate access requests from the legitimate user to the server computer from the client computer in encrypted form; and storing, by the server computer, the set of legitimate access requests from the legitimate user, the set of legitimate access requests from the legitimate user forming at least a part of the encrypted historical access request data.

12. A method as in claim 1, wherein each of a set of encrypted previous device identifiers is a bit string including bits;

wherein the instructions to perform the impersonation detection operation include a respective truth table corresponding to each bit of an encrypted previous device identifier of the set of encrypted previous device identifiers received from the server computer and forming at least a part of the encrypted historical access request data;

wherein the truth table corresponding to that bit of the encrypted previous device identifier includes entries having (i) possible values of that bit of the encrypted previous device identifier, (ii) possible values of a corresponding bit of a respective encrypted current device identifier of a set of encrypted current device identifiers produced by encrypting the current device identifiers, and (iii) possible values of an output bit based on the possible values of that bit of the encrypted previous device identifier and the possible values of the corresponding bit of the respective encrypted current device identifier; and wherein comparing the set of encrypted previous device identifiers and the set of encrypted current device identifiers includes, for a truth table corresponding to a bit of the encrypted previous device identifier, locating an entry of the truth table, the entry having the value of a bit of the encrypted previous device identifier and a value of a corresponding bit of the respective encrypted current device identifier to produce a value of a corresponding output bit.

13. An electronic system constructed and arranged to perform impersonation detection, the electronic system comprising:

a server computer; and a client computer including a network interface, memory, and controlling circuitry coupled to the memory, the controlling circuitry being constructed and arranged to:
  receive an access request that identifies a user and includes current access request data;
  after receiving the access request, obtain, from the server computer, (i) encrypted historical access request data representing previous access request activity of the user stored in the server computer and (ii) instructions to perform an impersonation detection operation; and
  perform, while the historical access request data remains encrypted, the impersonation detection operation based on the encrypted historical access request data and the current access request data to produce an impersonation detection result, the impersonation detection result indicating whether the access request was submitted by a person impersonating the user,
wherein the controlling circuitry of the client computer is further constructed and arranged to, prior to the client computer receiving the access request, encrypt a set of previous device identifiers to produce a set of encrypted previous device identifiers, the set of previous device identifiers identifying a set of previous devices by which a previous access request was submitted by the user;
wherein the current access request data includes a set of current device identifiers identifying a set of current devices by which the access request was submitted by the user;
wherein the controlling circuitry of the client computer is further constructed and arranged to encrypt the set of current device identifiers to produce a set of encrypted current device identifiers;
wherein the controlling circuitry of the client computer constructed and arranged to perform the impersonation detection operation is further constructed and arranged to compare the set of encrypted previous device identifiers and the set of encrypted current device identifiers to produce a comparison result, the impersonation detection result being based on the comparison result,
wherein each of the set of encrypted previous device identifiers is a bit string including bits;
wherein the instructions to perform the impersonation detection operation include a respective truth table corresponding to each bit of an encrypted previous device identifier of the set of encrypted previous device identifiers, the truth table corresponding to that bit of the encrypted previous device identifier including entries having (i) possible values of that bit of the encrypted previous device identifier, (ii) possible values of a corresponding bit of a respective encrypted current device identifier of the set of encrypted current device identifiers, and (iii) possible values of an output bit based on the possible values of that bit of the encrypted previous device identifier and the possible values of the corresponding bit of the respective encrypted current device identifier; and
wherein the controlling circuitry of the client computer constructed and arranged to compare the set of encrypted previous device identifiers and the set of encrypted current device identifiers is further constructed and arranged, for a truth table corresponding to a bit of the encrypted previous device identifier, to locate an entry of the truth table, the entry having the value of a bit of the encrypted previous device identifier and a value of a corresponding bit of the respective encrypted current device identifier to produce a value of a corresponding output bit.

14. An electronic system as in claim 13, wherein the set of previous device identifiers includes an encrypted hostname of a previous computer on which the previous access request was input;
  wherein the set of current device identifiers includes an encrypted hostname of a current computer on which the access request was input; and
  wherein the controlling circuitry of the client computer constructed and arranged to compare the set of encrypted previous device identifiers and the set of encrypted current device identifiers is further constructed and arranged to test whether the encrypted hostname of the previous computer and the encrypted hostname of the current computer are equal, the impersonation detection result indicating that the access request was not submitted by a person impersonating the user in response to the encrypted hostname of the previous device and the encrypted hostname of the current device being equal.

15. An electronic system as in claim 14, wherein the set of previous device identifiers further includes an encrypted network identifier of a previous network to which the previous computer was connected when the previous access request was submitted;
  wherein the set of current device identifiers further includes an encrypted network identifier of a current network to which the current computer was connected when the current access request was submitted; and
  wherein the controlling circuitry of the client computer constructed and arranged to compare the set of encrypted previous device identifiers and the set of encrypted current device identifiers is further constructed and arranged to test whether the encrypted network identifier of the previous network and the encrypted network identifier of the current network are equal, the impersonation detection result indicating that the access request was not submitted by a person impersonating the user in response to the testing finding that the encrypted network identifier of the previous network and the encrypted network identifier of the current network are equal.

16. An electronic system as in claim 13, wherein the impersonation detection result includes a risk score, a larger risk score indicating a larger risk that the access request was submitted by a person impersonating the user;
  wherein the controlling circuitry of the client computer constructed and arranged to perform the impersonation detection operation is further constructed and arranged to:
    input an initial value of the risk score, and
    modify the initial value of the risk score based on the comparison result to produce, as the impersonation detection result, a modified value of the risk score.

17. An electronic system as in claim 16, wherein the encrypted historical access data also includes a speed bit string representing (i) a previous time at which the previous access request was submitted and (ii) a previous geolocation of the previous computer at the previous time;
  wherein the current access request data includes (i) a current time at which the access request was submitted by the user and (ii) a current geolocation of the current device at the current time;

wherein the controlling circuitry of the client computer constructed and arranged to perform the impersonation detection operation is further constructed and arranged to:
- decrypt the speed bit string to produce the previous geolocation and the previous time,
- generate a speed based on the current geolocation, the previous geolocation, the current time, and the previous time, and
- produce the initial value of the risk score based on the speed.

18. An electronic system as in claim 16, wherein the encrypted historical access data also includes an encrypted previous country identifier identifying a previous country from which the previous access request was submitted;
- wherein the current access request data includes an encrypted current country identifier identifying a current country from which the current access request was submitted;
- wherein the controlling circuitry of the client computer constructed and arranged to compare the set of encrypted previous device identifiers and the set of encrypted current device identifiers is further constructed and arranged to test whether the encrypted previous country identifier and the encrypted current country identifier are equal; and
- wherein the controlling circuitry of the client computer constructed and arranged to modify the initial value of the risk score is further constructed and arranged to, in response to the encrypted previous country identifier and the encrypted current country identifier being equal, multiply the initial value of the risk score by a risk score reduction factor to produce a reduced risk score, the risk score reduction factor being a number between zero and 1.

19. A computer program product including a non-transitory, computer-readable storage medium which stores executable code, which when executed by a client computer, causes the client computer to perform a method of performing impersonation detection, the method comprising:
- receiving an access request that identifies a user and includes current access request data;
- after receiving the access request, obtaining, from a server computer, (i) encrypted historical access request data representing previous access request activity of the user stored in the server computer and (ii) instructions to perform an impersonation detection operation; and
- performing, while the historical access request data remains encrypted, the impersonation detection operation based on the encrypted historical access request data and the current access request data to produce an impersonation detection result, the impersonation detection result indicating whether the access request was submitted by a person impersonating the user,
- wherein the set of previous device identifiers includes an encrypted hostname of a previous computer on which the previous access request was input;
- wherein the set of current device identifiers includes an encrypted hostname of a current computer on which the access request was input;
- wherein comparing the set of encrypted previous device identifiers and the set of encrypted current device identifiers includes testing whether the encrypted hostname of the previous computer and the encrypted hostname of the current computer are equal, the impersonation detection result indicating that the access request was not submitted by a person impersonating the user in response to the encrypted hostname of the previous device and the encrypted hostname of the current device being equal,
- wherein encrypting the set of previous device identifiers to produce the set of encrypted previous device identifiers includes:
  - generating a previous salt value,
  - concatenating the previous salt value and a previous device identifier of the set of previous device identifiers to produce a previous concatenated string,
  - generating a previous keyed-hash message authentication code (HMAC) from the previous concatenated string, and
  - producing an encrypted previous device identifier from a predetermined number of the least significant bits of the previous HMAC; and
- wherein encrypting the set of current device identifiers to produce the set of encrypted current device identifiers includes:
  - receiving the previous salt value,
  - concatenating the previous salt value and a current device identifier of the set of current device identifiers to produce a current concatenated string,
  - generating a current HMAC from the current concatenated string, and
  - producing an encrypted current device identifier from the predetermined number of the least significant bits of the current HMAC.

20. A computer program product as recited in claim 19, wherein the method further comprises, after performing the impersonation detection operation:
- generating, by the client computer, a new salt value that is distinct from the previous salt value;
- concatenating the new salt value and a current device identifier of the set of current device identifiers to produce a new concatenated string,
- generating a new HMAC from the new concatenated string,
- producing an new encrypted previous device identifier from the predetermined number of the least significant bits of the new HMAC, and
- sending the new encrypted previous device identifier to the server computer, the server computer being unable to identify whether the user has any repeating values of the current device identifier.

* * * * *